US011982970B2

(12) United States Patent
Amann et al.

(10) Patent No.: US 11,982,970 B2
(45) **Date of Patent: *May 14, 2024**

(54) TONER CARTRIDGE HAVING POSITIONING FEATURES

(71) Applicant: LEXMARK INTERNATIONAL, INC., Lexington, KY (US)

(72) Inventors: Mark William Amann, Lexington, KY (US); Brian Lester Boettcher, Versailles, KY (US); James Anthany Carter, II, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,051

(22) Filed: Oct. 18, 2022

(65) Prior Publication Data

US 2023/0031026 A1 Feb. 2, 2023

Related U.S. Application Data

(60) Continuation of application No. 17/369,247, filed on Jul. 7, 2021, now Pat. No. 11,507,013, which is a continuation of application No. 16/997,010, filed on Aug. 19, 2020, now Pat. No. 11,086,268, which is a division of application No. 16/180,286, filed on Nov. 5, 2018, now Pat. No. 10,782,643.

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.

CPC ..... *G03G 21/1647* (2013.01); *G03G 15/0865* (2013.01); *G03G 21/1652* (2013.01);

(Continued)

(58) Field of Classification Search

CPC ........... G03G 21/1647; G03G 21/1652; G03G 21/1839; G03G 21/1842; G03G 21/1846;

(Continued)

(56) References Cited

U.S. PATENT DOCUMENTS

| | | | | |
|---|---|---|---|---|
| 7,072,603 B2 * | 7/2006 | Tsuzuki | ............. | G03G 21/1821 399/113 |
| 10,782,643 B2 * | 9/2020 | Amann | .............. | G03G 21/1853 |

(Continued)

OTHER PUBLICATIONS

English translation of Office Action dated Jan. 3, 2024 for Chinese Patent Application No. 2019800879984.

*Primary Examiner* — Carla J Therrien

(74) *Attorney, Agent, or Firm* — Justin M. Tromp

(57) ABSTRACT

A toner cartridge according to one example embodiment includes a housing having a reservoir for holding toner. A first latch-receiving shelf is positioned on a first longitudinal end of the housing and a second latch-receiving shelf is positioned on a second longitudinal end of the housing. Contact surfaces on top portions of the first and second latch-receiving shelves are positioned to contact corresponding first and second latches in an image forming device. The contact surface of the first latch-receiving shelf is positioned lower than a first rotational axis of a first drive coupler of the toner cartridge and higher than a second drive coupler of the toner cartridge. The contact surface of the second latch-receiving shelf is positioned lower than at least a portion of a first electrical contact of the toner cartridge and higher than at least a portion of a second electrical contact of the toner cartridge.

4 Claims, 11 Drawing Sheets

(52) U.S. Cl.
CPC ..... *G03G 21/1676* (2013.01); *G03G 21/1853* (2013.01); *G03G 21/1846* (2013.01)

(58) Field of Classification Search
CPC ........... G03G 21/1853; G03G 21/1857; G03G 21/186; G03G 21/1864; G03G 21/1867; G03G 21/1871
See application file for complete search history.

(56) References Cited

U.S. PATENT DOCUMENTS

| | | | | |
|---|---|---|---|---|
| 11,086,268 | B2 * | 8/2021 | Amann | G03G 21/1652 |
| 11,507,013 | B2 * | 11/2022 | Amann | G03G 15/0865 |
| 2003/0156848 | A1 * | 8/2003 | Kawai | G03G 21/1871 399/27 |
| 2008/0159773 | A1 * | 7/2008 | Murayama | G03G 21/1867 399/110 |
| 2008/0292356 | A1 * | 11/2008 | Furuichi | G03G 21/1853 399/110 |
| 2010/0166453 | A1 * | 7/2010 | Okabe | G03G 15/0194 399/119 |
| 2014/0093273 | A1 * | 4/2014 | Hayakawa | G03G 21/18 399/111 |
| 2015/0055974 | A1 * | 2/2015 | Hoashi | G03G 21/1623 399/110 |
| 2019/0278220 | A1 * | 9/2019 | Sakurai | G03G 21/1647 |

* cited by examiner

TONER CARTRIDGE HAVING POSITIONING FEATURES

CROSS REFERENCES TO RELATED APPLICATIONS

This application is a continuation application of U.S. patent application Ser. No. 17/369,247, filed Jul. 7, 2021, entitled "Toner Cartridge Having Positioning Features," which is a continuation application of U.S. patent application Ser. No. 16/997,010, filed Aug. 19, 2020, now U.S. Pat. No. 11,086,268, issued Aug. 10, 2021, entitled "Toner Cartridge Having Positioning Features," which is a divisional application of U.S. patent application Ser. No. 16/180,286, filed Nov. 5, 2018, now U.S. Pat. No. 10,782,643, issued Sep. 22, 2020, entitled "Toner Cartridge Having Positioning Features."

BACKGROUND

1. Field of the Disclosure

The present disclosure relates generally to image forming devices and more particularly to a toner cartridge having positioning features.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable toner cartridges that have a shorter lifespan than the image forming device. It is important that the toner cartridge(s) are precisely aligned within the image forming device. If a toner cartridge is misaligned, one or more input gears on the toner cartridge may fail to maintain proper gear mesh with corresponding output gears in the image forming device and one or more electrical contacts on the toner cartridge may fail to maintain an electrical connection with corresponding electrical contacts in the image forming device. Further, if a toner cartridge is misaligned, various imaging components of the toner cartridge (such as a photoconductive drum) may be incorrectly positioned relative to the image forming device potentially resulting in toner leakage or print quality defects. The toner cartridge(s) must also be rigidly held in place after installation in the image forming device in order to prevent the positional alignment of the toner cartridge(s) from being disturbed during operation. The requirement for tight positional control must be balanced with the need to permit a user to easily load and unload the toner cartridge(s) into and out of the image forming device. Accordingly, it will be appreciated that precise alignment of the toner cartridge(s) and relatively simple insertion and removal of the toner cartridge(s) into and out of the image forming device is desired.

SUMMARY

A toner cartridge according to one example embodiment includes a housing having a top, a bottom, a first side and a second side positioned between a first longitudinal end and a second longitudinal end of the housing. The housing has a reservoir for holding toner. A first drive coupler and a second drive coupler are positioned on the first longitudinal end of the housing for mating with a first corresponding drive coupler in an image forming device and a second corresponding drive coupler in the image forming device for receiving rotational motion from the first corresponding drive coupler in the image forming device and the second corresponding drive coupler in the image forming device when the toner cartridge is installed in the image forming device. The first drive coupler of the toner cartridge is positioned higher than the second drive coupler of the toner cartridge. The first drive coupler of the toner cartridge has a first rotational axis and the second drive coupler of the toner cartridge has a second rotational axis. An engagement member is positioned on the first longitudinal end of the housing. A contact surface of the engagement member is unobstructed from above permitting the contact surface of the engagement member to contact a corresponding hold-down in the image forming device and receive a downward hold-down force from the corresponding hold-down in the image forming device when the toner cartridge is installed in the image forming device. The contact surface of the engagement member is positioned lower than the first rotational axis of the first drive coupler of the toner cartridge and higher than the second drive coupler of the toner cartridge. In some embodiments, the contact surface of the engagement member is positioned lower than the first drive coupler of the toner cartridge. In some embodiments, the contact surface of the engagement member is positioned directly above the second drive coupler of the toner cartridge.

Some embodiments include a photoconductive drum rotatably positioned on the housing and a developer roll rotatably positioned on the housing and positioned to supply toner from the reservoir to the photoconductive drum. A portion of an outer surface of the photoconductive drum is exposed along the bottom of the housing. The first drive coupler of the toner cartridge is operatively connected to the developer roll to transfer rotational motion to the developer roll and the second drive coupler of the toner cartridge is operatively connected to the photoconductive drum to transfer rotational motion to the photoconductive drum.

Embodiments include those wherein the contact surface of the engagement member overlaps with the second drive coupler of the toner cartridge along a lateral dimension of the housing that runs from the first side to the second side. The contact surface of the engagement member is positioned closer to the first side of the housing than the first rotational axis is to the first side of the housing. The first rotational axis is positioned closer to the second side of the housing than to the first side of the housing.

Some embodiments include a boss protruding outward from the first longitudinal end of the housing surrounding at least a portion of the second drive coupler of the toner cartridge. A bottom surface of the boss is unobstructed from below permitting the bottom surface of the boss to contact a corresponding frame in the image forming device for controlling a position of the toner cartridge when the toner cartridge is installed in the image forming device. The engagement member is formed integrally with the boss.

A toner cartridge according to another example embodiment includes a housing having a top, a bottom, a first side and a second side positioned between a first longitudinal end and a second longitudinal end of the housing. The housing has a reservoir for holding toner. A first electrical contact and a second electrical contact are positioned on the first longitudinal end of the housing for contacting a first corresponding electrical contact in an image forming device and a second corresponding electrical contact in the image forming device when the toner cartridge is installed in the image forming device. The first electrical contact of the toner cartridge is electrically connected to processing circuitry positioned on the housing. The second electrical contact of the toner cartridge is electrically connected to an imaging component positioned on the housing. The first electrical contact of the toner cartridge is positioned higher than the second electrical contact of the toner cartridge. An engagement member is positioned on the first longitudinal end of the housing. A contact surface of the engagement member is unobstructed from above permitting the contact surface of the engagement member to contact a corresponding hold-down in the image forming device and receive a downward hold-down force from the corresponding hold-down in the image forming device when the toner cartridge is installed in the image forming device. The contact surface of the engagement member is positioned lower than at least a portion of the first electrical contact of the toner cartridge and higher than at least a portion of the second electrical contact of the toner cartridge. In some embodiments, the contact surface of the engagement member is positioned directly above at least a portion of the second electrical contact of the toner cartridge.

Embodiments include those wherein the contact surface of the engagement member overlaps with at least a portion of the first electrical contact of the toner cartridge and at least a portion of the second electrical contact of the toner cartridge along a lateral dimension of the housing that runs from the first side to the second side.

Some embodiments include a photoconductive drum rotatably positioned on the housing and a boss protruding outward from the first longitudinal end of the housing at least partially surrounding a rotational axis of the photoconductive drum. A portion of an outer surface of the photoconductive drum is exposed along the bottom of the housing. A bottom surface of the boss is unobstructed from below permitting the bottom surface of the boss to contact a corresponding frame in the image forming device for controlling a position of the toner cartridge when the toner cartridge is installed in the image forming device. The contact surface of the engagement member is positioned higher than the boss. In some embodiments, the contact surface of the engagement member overlaps with the boss along a lateral dimension of the housing that runs from the first side to the second side.

In some embodiments, the engagement member is formed integrally with a portion of the housing that protrudes outward away from the first longitudinal end of the housing and that supports the second electrical contact of the toner cartridge.

A toner cartridge according to another example embodiment includes a housing having a top, a bottom, a first side and a second side positioned between a first longitudinal end and a second longitudinal end of the housing. The housing has a reservoir for holding toner. A first drive coupler and a second drive coupler are positioned on the first longitudinal end of the housing for mating with a first corresponding drive coupler in an image forming device and a second corresponding drive coupler in the image forming device for receiving rotational motion from the first corresponding drive coupler in the image forming device and the second corresponding drive coupler in the image forming device when the toner cartridge is installed in the image forming device. The first drive coupler of the toner cartridge is positioned higher than the second drive coupler of the toner cartridge. The first drive coupler of the toner cartridge has a first rotational axis and the second drive coupler of the toner cartridge has a second rotational axis. A first electrical contact and a second electrical contact are positioned on the second longitudinal end of the housing for contacting a first corresponding electrical contact in the image forming device and a second corresponding electrical contact in the image forming device when the toner cartridge is installed in the image forming device. The first electrical contact of the toner cartridge is electrically connected to processing circuitry positioned on the housing. The second electrical contact of the toner cartridge is electrically connected to an imaging component positioned on the housing. The first electrical contact of the toner cartridge is positioned higher than the second electrical contact of the toner cartridge. A first latch-receiving shelf is positioned on the first longitudinal end of the housing and a second latch-receiving shelf is positioned on the second longitudinal end of the housing. Contact surfaces on top portions of the first and second latch-receiving shelves are positioned to contact corresponding first and second latches in the image forming device and to receive downward hold-down forces from the corresponding first and second latches in the image forming device when the toner cartridge is installed in the image forming device. The contact surface of the first latch-receiving shelf is positioned lower than the first rotational axis of the first drive coupler of the toner cartridge and higher than the second drive coupler of the toner cartridge. The contact surface of the second latch-receiving shelf is positioned lower than at least a portion of the first electrical contact of the toner cartridge and higher than at least a portion of the second electrical contact of the toner cartridge. In some embodiments, the contact surface of the first latch-receiving shelf is positioned lower than the contact surface of the second latch-receiving shelf. In some embodiments, the contact surface of the first latch-receiving shelf is positioned lower than the first drive coupler of the toner cartridge. In some embodiments, the contact surface of the first latch-receiving shelf is positioned directly above the second drive coupler of the toner cartridge. In some embodiments, the contact surface of the second latch-receiving shelf is positioned directly above at least a portion of the second electrical contact of the toner cartridge.

Some embodiments include a photoconductive drum rotatably positioned on the housing and a developer roll rotatably positioned on the housing and positioned to supply toner from the reservoir to the photoconductive drum. A portion of an outer surface of the photoconductive drum is exposed along the bottom of the housing. The first drive coupler of the toner cartridge is operatively connected to the developer roll to transfer rotational motion to the developer roll and the second drive coupler of the toner cartridge is operatively connected to the photoconductive drum to transfer rotational motion to the photoconductive drum.

Embodiments include those wherein the contact surface of the first latch-receiving shelf overlaps with the second drive coupler of the toner cartridge along a lateral dimension of the housing that runs from the first side to the second side. The contact surface of the first latch-receiving shelf is positioned closer to the first side of the housing than the first rotational axis is to the first side of the housing. The first rotational axis is positioned closer to the second side of the housing than to the first side of the housing.

Embodiments include those wherein the contact surface of the second latch-receiving shelf overlaps with at least a portion of the first electrical contact of the toner cartridge and at least a portion of the second electrical contact of the toner cartridge along a lateral dimension of the housing that runs from the first side to the second side.

In some embodiments, the second latch-receiving shelf is formed integrally with a portion of the housing that protrudes outward away from the second longitudinal end of the housing and that supports the second electrical contact of the toner cartridge.

Some embodiments include a photoconductive drum rotatably positioned on the housing, a first boss protruding outward from the first longitudinal end of the housing at least partially surrounding a third rotational axis of the photoconductive drum and a second boss protruding outward from the second longitudinal end of the housing at least partially surrounding the third rotational axis of the photoconductive drum. A portion of an outer surface of the photoconductive drum is exposed along the bottom of the housing. Bottom surfaces of the first and second bosses are positioned to contact corresponding first and second frames in the image forming device for controlling a position of the toner cartridge when the toner cartridge is installed in the image forming device. The contact surfaces of the first and second latch-receiving shelves are positioned higher than the first and second bosses. In some embodiments, the contact surface of the first latch-receiving shelf overlaps with the first boss along a lateral dimension of the housing that runs from the first side to the second side and the contact surface of the second latch-receiving shelf overlaps with the second boss along the lateral dimension of the housing. In some embodiments, the first latch-receiving shelf is formed integrally with the first boss.

BRIEF DESCRIPTION OF THE DRAWINGS

The accompanying drawings incorporated in and forming a part of the specification illustrate several aspects of the present disclosure and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
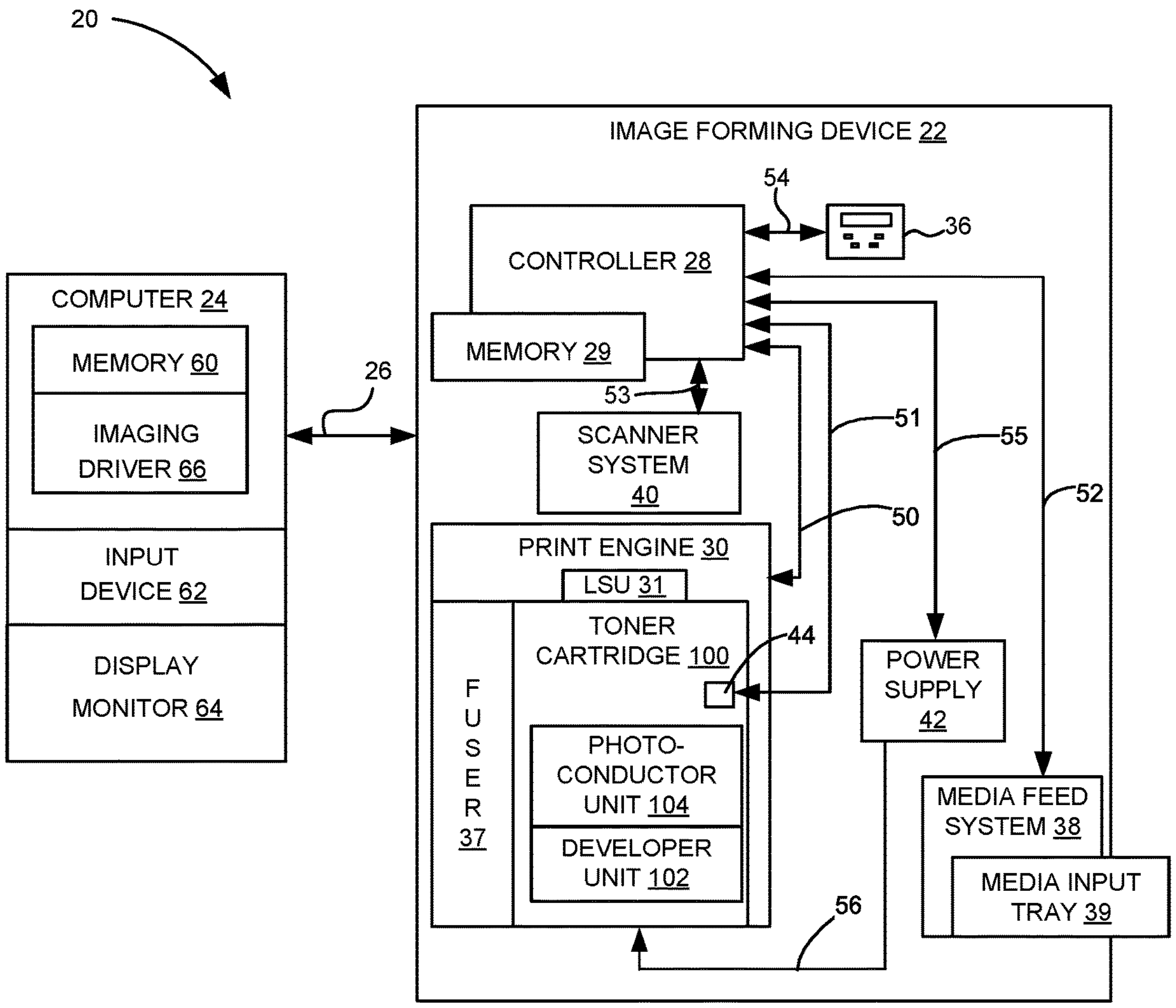
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, a toner cartridge 100, a user interface 36, a media feed system 38, a media input tray 39, a scanner system 40 and a power supply 42. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor unit may include one or more integrated circuits in the form of a microprocessor or central processing unit and may include one or more Application-Specific Integrated Circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with toner cartridge 100 and processing circuitry 44 thereon via a communications link 51. Controller 28 communicates with media feed system 38 via a communications link 52. Controller 28 communicates with scanner system 40 via a communications link 53. User interface 36 is communicatively coupled to controller 28 via a communications link 54. Controller 28 communicates with power supply 42 via a communications link 55. Controller 28 processes print and scan data and operates print engine 30 during printing and scanner system 40 during scanning. Processing circuitry 44 may provide authentication functions, safety and operational interlocks, operating parameters and usage information related to toner cartridge 100. Processing circuitry 44 includes a processor unit and associated electronic memory. As discussed above, the processor may include one or more integrated circuits in the form of a microprocessor or central processing unit and/or may include one or more Application-Specific Integrated Circuits (ASICs). The memory may be any volatile or non-volatile memory or combination thereof or any memory device convenient for use with processing circuitry 44.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100 and a fuser 37, all mounted within image forming device 22. Toner cartridge 100 is removably mounted in image forming device 22. Power supply 42 provides an electrical voltage to various components of toner cartridge 100 via an electrical path 56. Toner cartridge 100 includes a developer unit 102 that houses a toner reservoir and a toner development system. In one embodiment, the toner development system utilizes what is commonly referred to as a single component development system. In this embodiment, the toner development system includes a toner adder roll that provides toner from the toner reservoir to a developer roll. A doctor blade provides a metered, uniform layer of toner on the surface of the developer roll. In another embodiment, the toner development system utilizes what is commonly referred to as a dual component development system. In this embodiment, toner in the toner reservoir of developer unit 102 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer unit 102 includes a developer roll that attracts the magnetic carrier beads having toner thereon to the developer roll through the use of magnetic fields. Toner cartridge 100 also includes a photoconductor unit 104 that houses a charge roll, a photoconductive drum and a waste toner removal system. Although the example image forming device 22 illustrated in FIG. 1 includes one toner cartridge, in the case of an image forming device configured to print in color, separate toner cartridges may be used for each toner color. For example, in one embodiment, the image forming device includes four toner cartridges, each toner cartridge containing a particular toner color (e.g., black, cyan, yellow and magenta) to permit color printing.

Figure 2:
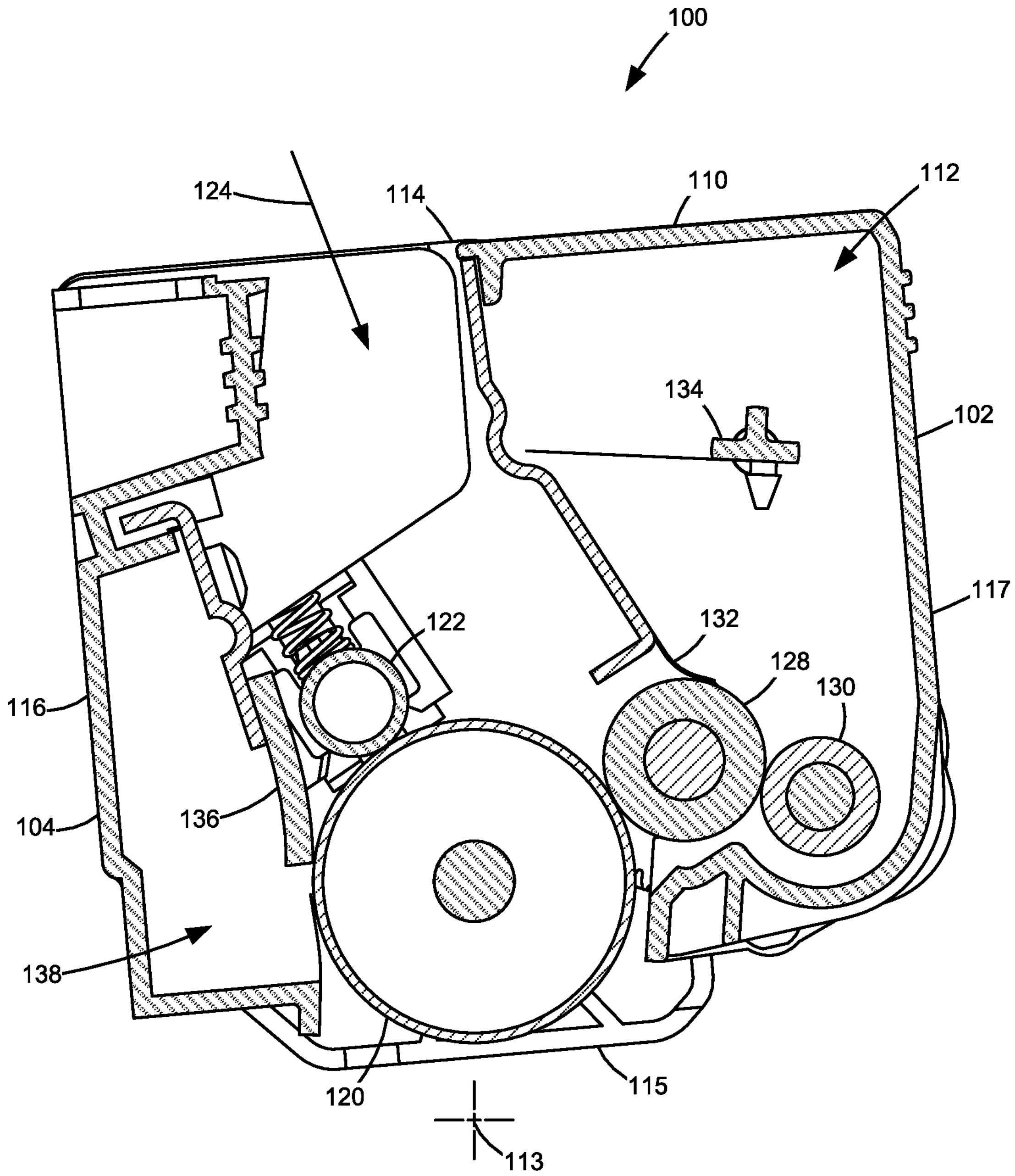
FIG. 2 is a cross-sectional view of a toner cartridge of the imaging system according to one example embodiment.

FIG. 2 shows toner cartridge 100 according to one example embodiment. Toner cartridge 100 includes an elongated housing 110 that includes walls forming a toner reservoir 112. In the example embodiment illustrated, housing 110 extends along a longitudinal dimension 113 and includes a top 114, a bottom 115, a first side 116 and a second side 117 that extend between longitudinal ends 118, 119 (FIGS. 3 and 4) of housing 110. In this embodiment, developer unit 102 is positioned along side 117 of housing 110 and photoconductor unit 104 is positioned along side 116 of housing 110.

The electrophotographic printing process is well known in the art and, therefore, is described briefly herein. During a print operation, a rotatable charge roll 122 of photoconductor unit 104 charges the surface of a rotatable photoconductive drum 120. The charged surface of photoconductive drum 120 is then selectively exposed to a laser light source 124 from LSU 31 through a slit 126 (FIGS. 3 and 4) in the top 114 of housing 110 to form an electrostatic latent image on photoconductive drum 120 corresponding to the image to be printed. Charged toner from developer unit 102 is picked up by the latent image on photoconductive drum 120 creating a toned image on the surface of photoconductive drum 120. Charge roll 122 and photoconductive drum 120 are each electrically charged to a respective predetermined voltage by power supply 42 in order to achieve a desired voltage differential between the charged portions of the surface of photoconductive drum 120 and the portions of the surface of photoconductive drum 120 discharged by laser light source 124.

Developer unit 102 includes toner reservoir 112 having toner stored therein and a rotatable developer roll 128 that supplies toner from toner reservoir 112 to photoconductive drum 120. In the example embodiment illustrated, a rotatable toner adder roll 130 in developer unit 102 supplies toner from toner reservoir 112 to developer roll 128. A doctor blade 132 disposed along developer roll 128 provides a substantially uniform layer of toner on developer roll 128 for transfer to photoconductive drum 120. As developer roll 128 and photoconductive drum 120 rotate, toner particles are electrostatically transferred from developer roll 128 to the latent image on photoconductive drum 120 forming a toned image on the surface of photoconductive drum 120. In one embodiment, developer roll 128 and photoconductive drum 120 rotate in opposite rotational directions such that their adjacent surfaces move in the same direction to facilitate the transfer of toner from developer roll 128 to photoconductive drum 120. One or more movable toner agitators 134 may be provided in toner reservoir 112 to distribute the toner therein and to break up any clumped toner. Developer roll 128 and toner adder roll 130 are each electrically charged to a respective predetermined voltage by power supply 42 in order to attract toner from reservoir 112 to toner adder roll 130 and to electrostatically transfer toner from toner adder roll 130 to developer roll 128 and from developer roll 128 to the latent image on the surface of photoconductive drum 120. Doctor blade 132 may also be electrically charged to a predetermined voltage by power supply 42 as desired.

The toned image is then transferred from photoconductive drum 120 to the print media (e.g., paper) either directly by photoconductive drum 120 or indirectly by an intermediate transfer member. In the example embodiment illustrated, the surface of photoconductive drum 120 is exposed along the bottom 115 of housing 110 where the toned image transfers from photoconductive drum 120 to the print media or intermediate transfer member. Fuser 37 (FIG. 1) then fuses the toner to the print media. A cleaner blade 136 (or cleaner roll) of photoconductor unit 104 removes any residual toner adhering to photoconductive drum 120 after the toner is transferred from photoconductive drum 120 to the print media or intermediate transfer member. Waste toner from cleaner blade 136 may be held in a waste toner reservoir 138 in photoconductor unit 104 as illustrated or moved to a separate waste toner container. The cleaned surface of photoconductive drum 120 is then ready to be charged again and exposed to laser light source 124 to continue the printing cycle.

Figure 3:
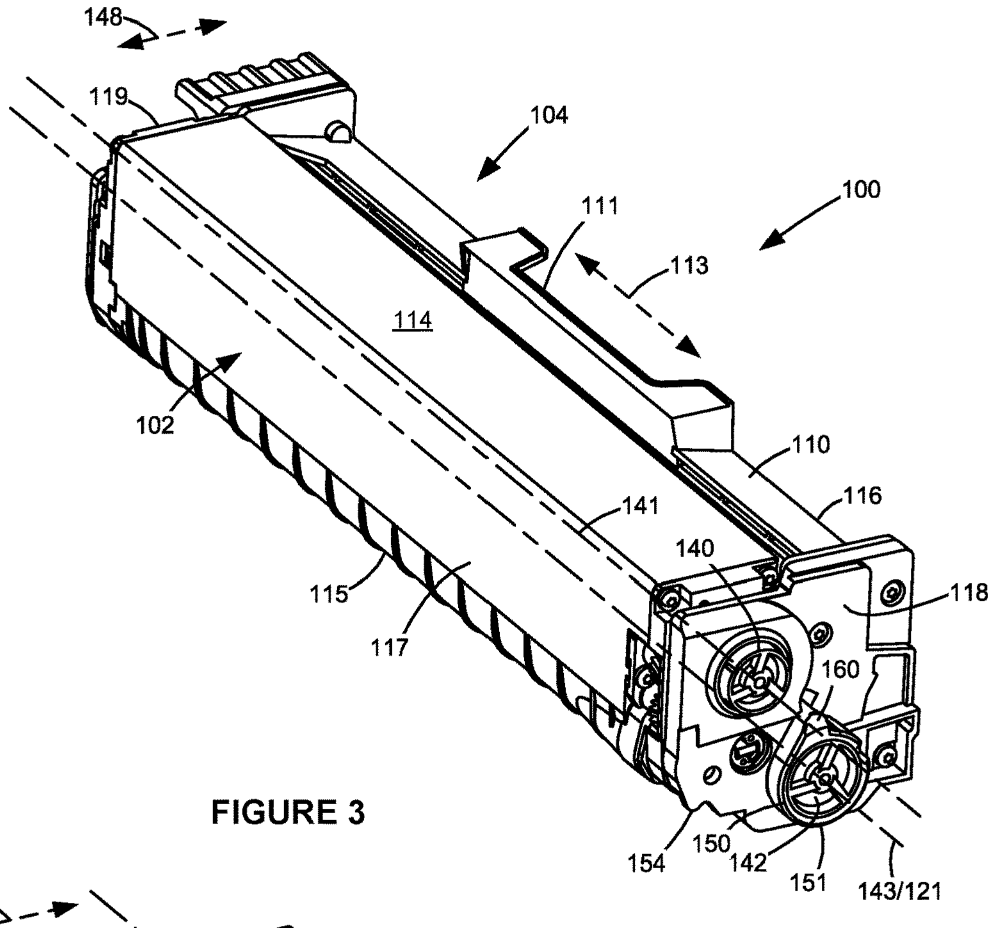
FIGS. 3 and 4 are perspective views of the toner cartridge according to one example embodiment.
Figure 4:
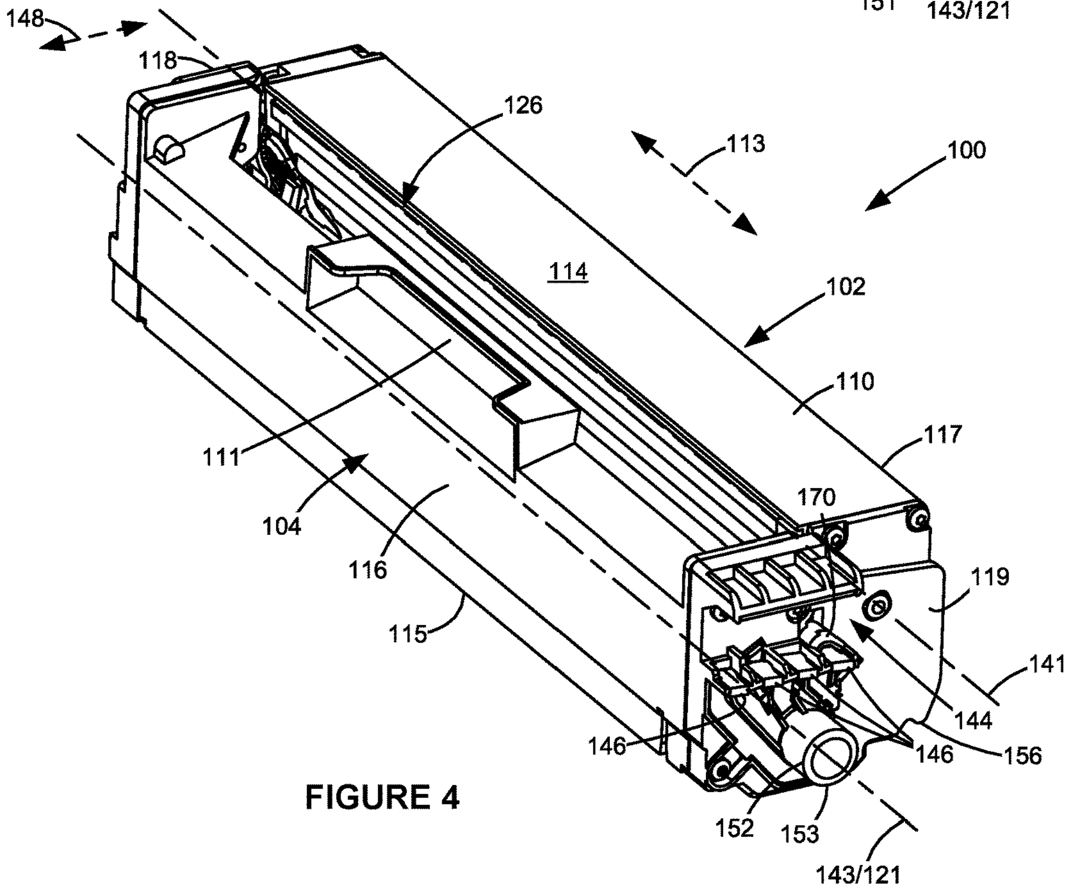
Figure 5:
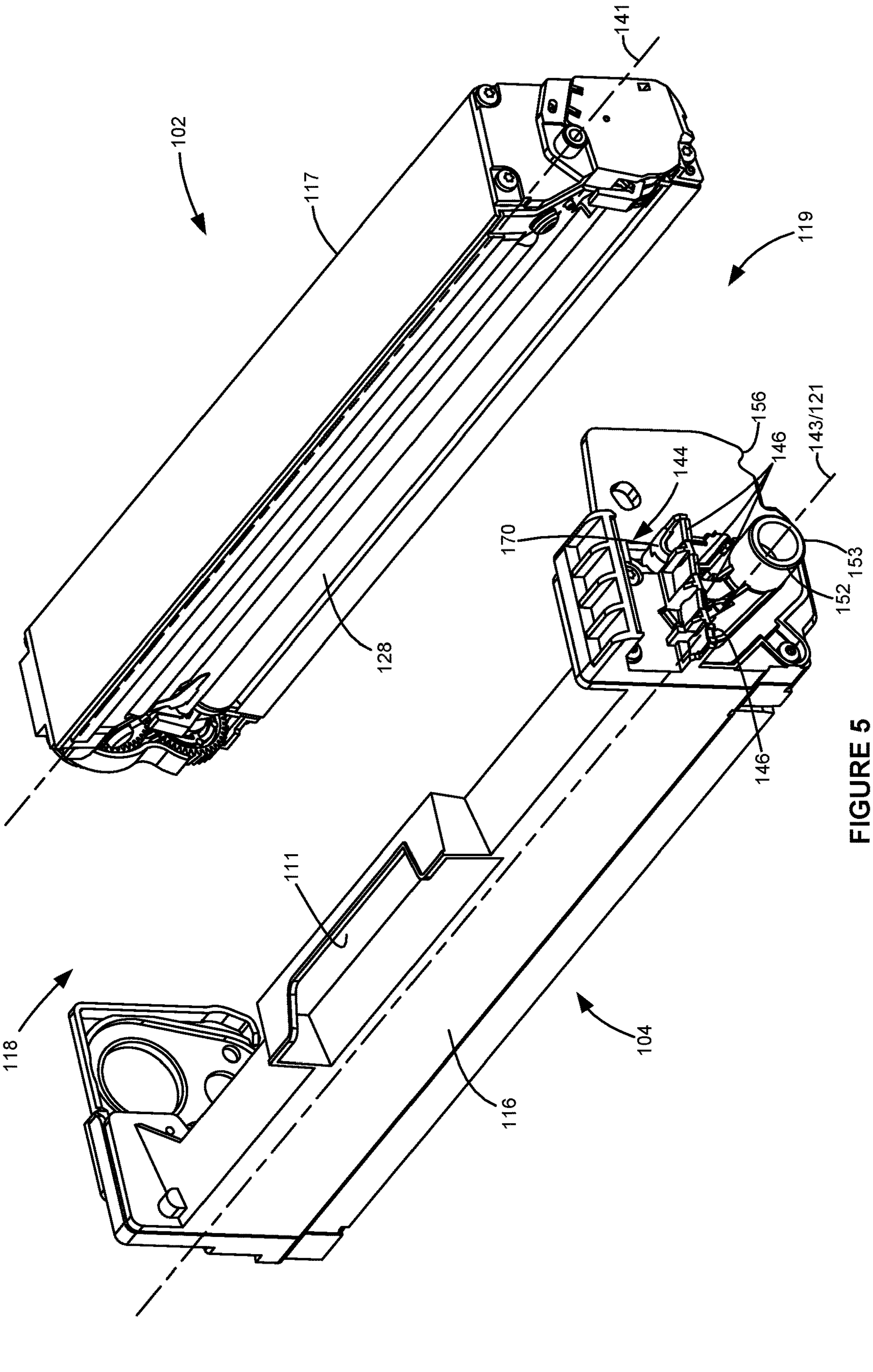
FIG. 5 is an exploded view of the toner cartridge shown in FIGS. 3 and 4 showing a developer unit and a photoconductor unit of the toner cartridge according to one example embodiment.

FIGS. 3-5 show the exterior of toner cartridge 100 according to one example embodiment. As shown, in this embodiment, developer unit 102 is positioned at side 117 of housing 110 and photoconductor unit 104 is positioned at side 116 of housing 110. FIG. 5 shows developer unit 102 separated from photoconductor unit 104 with developer roll 128 exposed on developer unit 102 for mating with photoconductive drum 120. In the example embodiment illustrated, toner cartridge 100 includes a handle 111 positioned along side 116 and/or top 114 of housing 110 to assist the user with handling toner cartridge 100.

Figure 6:
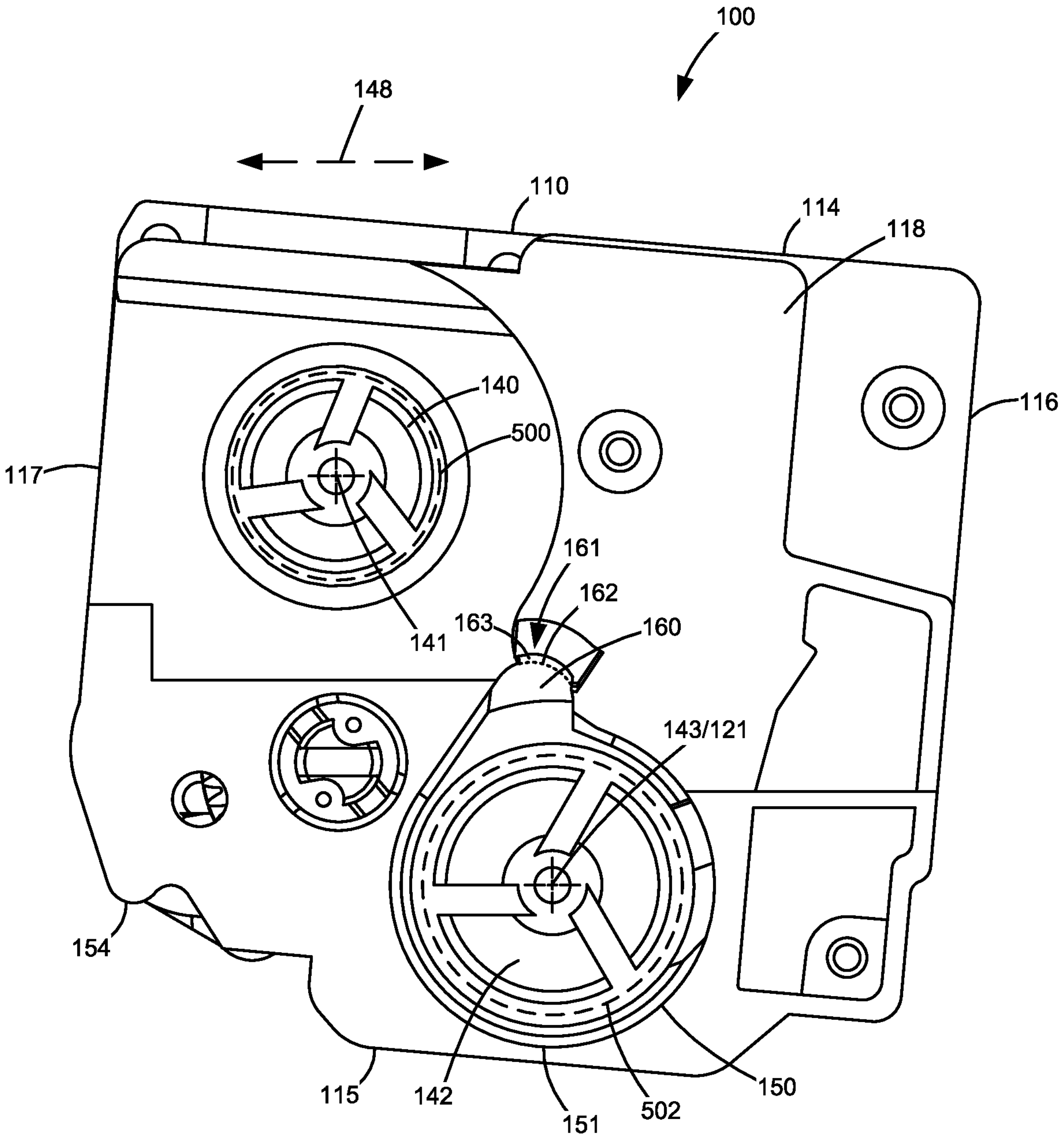
FIG. 6 is a first side elevation view of the toner cartridge of FIGS. 3-5 according to one example embodiment.

With reference to FIGS. 3 and 6, in the example embodiment illustrated, a pair of drive couplers 140, 142 are exposed on an outer portion of housing 110 in position to receive rotational force from a corresponding drive system in image forming device 22 when toner cartridge 100 is installed in image forming device 22 to drive rotatable components of developer unit 102 and photoconductive drum 120, respectively. The drive system in image forming device 22 includes one or more drive motors and a drive transmission from the drive motor(s) to a pair of drive couplers 500, 502 (shown schematically in dashed line in FIG. 6) that mate with drive couplers 140, 142 of toner cartridge 100 when toner cartridge 100 is installed in image forming device 22. In the example embodiment illustrated, drive couplers 140, 142 are each exposed on end 118 of housing 110. Each drive coupler 140, 142 includes a rotational axis 141, 143. In the example embodiment illustrated, drive couplers 140, 142 are each configured to mate with and receive rotational motion from the corresponding drive couplers in image forming device 22 at the axial ends of drive couplers 140, 142. Drive coupler 140 is operatively connected (either directly or indirectly through one or more intermediate gears) to rotatable components of developer unit 120 including, for example, developer roll 128, toner adder roll 130 and toner agitator 134, to rotate developer roll 128, toner adder roll 130 and toner agitator 134 upon receiving rotational force from the corresponding drive system in image forming device 22. Drive coupler 142 is operatively connected (either directly as in the embodiment illustrated or indirectly through one or more intermediate gears) to photoconductive drum 120 to rotate photoconductive drum 120 upon receiving rotational force from the corresponding drive system in image forming device 22. In some embodiments, charge roll 122 is driven by friction contact between the surfaces of charge roll 122 and photoconductive drum 120. In other embodiments, charge roll 122 is connected to drive coupler 142 by one or more gears.

Figure 7:
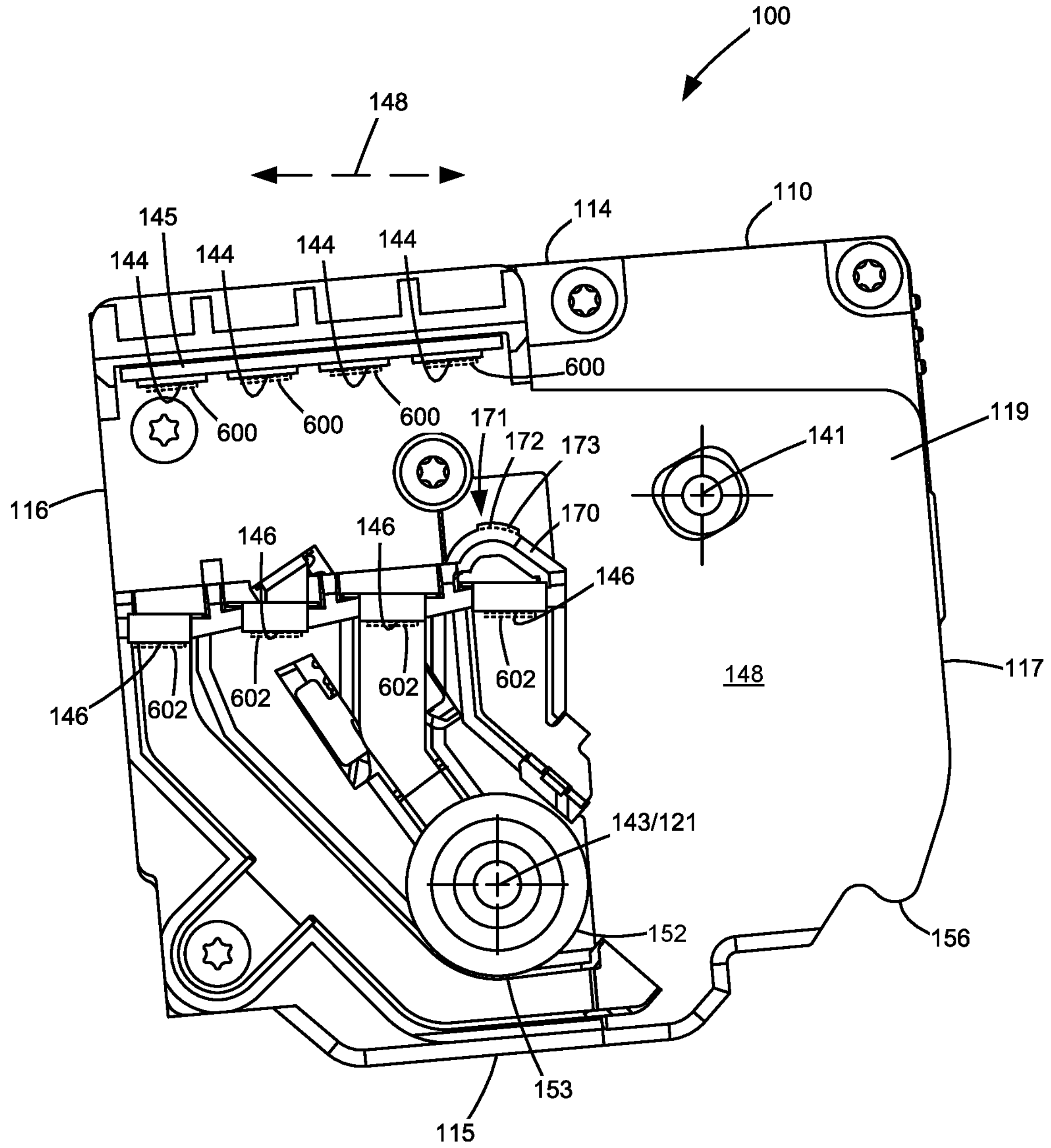
FIG. 7 is a second side elevation view of the toner cartridge of FIGS. 3-6 according to one example embodiment.

With reference to FIGS. 4 and 7, in the example embodiment illustrated, toner cartridge 100 includes one or more electrical contacts 144 positioned on end 119 of housing 110 and electrically connected to processing circuitry 44 and one or more electrical contacts 146 positioned on end 119 of housing 110 and electrically connected to one or more imaging components of toner cartridge 100. Electrical contacts 144 and 146 are positioned to contact corresponding electrical contacts 600, 602 (shown schematically in dotted line in FIG. 7) in image forming device 22 when toner cartridge 100 is installed in image forming device 22 in order to facilitate communications link 51 between processing circuitry 44 and controller 28 and electrical path 56 between the one or more imaging components of toner cartridge 100 and power supply 42. In the example embodiment illustrated, electrical contacts 144 are positioned on a printed circuit board 145 that is mounted to housing 110 and that includes processing circuitry 44 thereon. In another embodiment, processing circuitry 44 is positioned elsewhere on housing 110 and is electrically connected to electrical contacts 144, for example, by suitable traces or cabling. In the example embodiment illustrated, electrical contacts 146 include discrete electrical contacts each electrically connected to one of photoconductive drum 120, charge roll 122, developer roll 128 and toner adder roll 130.

Electrical contacts 144 and 146 are unobstructed on end 119 of housing 110 permitting electrical contacts 144 and 146 to mate with corresponding electrical contacts in image forming device 22 upon installation of toner cartridge 100 into image forming device 22. In the example embodiment illustrated, electrical contacts 144 and 146 are each exposed and unobstructed from below (in a direction from bottom 115 to top 114 of housing 110) permitting the corresponding electrical contacts in image forming device 22 to contact electrical contacts 144 and 146 from below upon installation of toner cartridge 100 into image forming device 22. In the example embodiment illustrated, electrical contacts 144 are positioned higher than electrical contacts 146, such as directly above electrical contacts 146 as shown. In this embodiment, electrical contacts 144 and 146 extend outward, away from end 119, along an axial dimension of photoconductive drum 120. In the example embodiment illustrated, electrical contacts 144 are positioned adjacent to the top 114 of housing 110, higher than rotational axes 141, 143 of drive couplers 140, 142 and higher than rotational axis 121 of photoconductive drum 120. In this embodiment, electrical contacts 146 are positioned approximately midway up end 119 of housing 110, higher than rotational axis 143 of drive coupler 142 and higher than rotational axis 121 of photoconductive drum 120, but lower than rotational axis 141 of drive coupler 140. In the example embodiment illustrated, electrical contacts 144 and 146 are positioned adjacent to side 116 of housing 110. Electrical contacts 144 are aligned with electrical contacts 146 along a lateral dimension 148 of housing 110 that runs from side 116 to side 117, orthogonal to longitudinal dimension 113, such that electrical contacts 144 overlap with electrical contacts 146 along lateral dimension 148. Electrical contacts 144, 146 are spaced toward side 116 of housing 110 from rotational axis 141 of drive coupler 140, which is positioned closer to side 117 of housing 110 than to side 116 of housing 110 in the embodiment illustrated.

With reference to FIGS. 3-7, in the example embodiment illustrated, toner cartridge 100 includes a pair of positioning bosses 150, 152 that each protrude outward away from a respective end 118, 119 of housing 110 at and along a rotational axis 121 of photoconductive drum 120. Boss 150 is positioned on end 118 of housing 110 and at least partially encircles drive coupler 142. Boss 152 is positioned on end 119 of housing 110 at rotational axes 121 and 143 of photoconductive drum 120 and drive coupler 142. Each boss 150, 152 is unobstructed from below permitting the boss 150, 152 to contact and sit in a corresponding V-block in image forming device 22 in order to define a vertical position of toner cartridge 100 and a horizontal position of toner cartridge 100 along lateral dimension 148 as discussed in greater detail below. In the example embodiment illustrated, a bottom portion of each boss 150, 152 includes a rounded bottom surface 151, 153, e.g., formed along an are of a circle, that contacts and sits in the corresponding V-block in image forming device 22. In the embodiment illustrated, each boss 150, 152 is formed integrally with a respective end 118, 119 of housing 110.

In the example embodiment illustrated, toner cartridge 100 includes a pair of rotational stops 154, 156 that prevent rotation of toner cartridge 100 about an axis parallel to longitudinal dimension 113 of housing 110 when toner cartridge 100 is installed in image forming device 22. Each rotational stop 154, 156 is positioned along the bottom 115 of housing 110 at side 117 of housing 110 at a respective end 118, 119 of housing 110. In the embodiment illustrated, rotational stops 154, 156 are formed by members, such as extensions or feet, that protrude downward from the bottom 115 of housing 110 at ends 118, 119 of housing 110. Each rotational stop 154, 156 is unobstructed from below permitting each rotational stop 154, 156 to contact a corresponding portion of a frame in image forming device 22 in order to define a rotational position of toner cartridge 100 as discussed in greater detail below. In the embodiment illustrated, each rotational stop 154, 156 is formed integrally with a respective end 118, 119 of housing 110 and corresponding boss 150, 152.

Toner cartridge 100 also includes a pair of hold-down engagement members 160, 170 that each contact a corresponding hold-down in image forming device 22 and receive a corresponding bias force to maintain contact between bosses 150, 152 of toner cartridge 100 and the corresponding V-blocks in image forming device 22 and between rotational stops 154, 156 of toner cartridge 100 and the corresponding portions of the frame in image forming device 22 during operation of toner cartridge 100 in image forming device 22 as discussed in greater detail below. Each engagement member 160, 170 is unobstructed from above permitting the corresponding hold-downs in image forming device 22 to contact engagement members 160, 170 from above in order to apply a downward force on engagement members 160, 170, including, for example, a primarily downward force on engagement members 160, 170.

With reference to FIG. 6, engagement member 160 is positioned on end 118 of housing 110 higher than drive coupler 142, such as directly above drive coupler 142 as illustrated, and lower than drive coupler 140. Engagement member 160 overlaps with drive coupler 142 along lateral dimension 148 and is spaced toward side 116 of housing 110 from drive coupler 140. In the embodiment illustrated, engagement member 160 is positioned slightly toward side 117 of housing 110 relative to rotational axis 121 of photoconductive drum 120 and rotational axis 143 of drive coupler 142. In the embodiment illustrated, engagement member 160 includes a latch-receiving shelf 161 having a rounded contact surface 162 that faces upward permitting the corresponding hold-down in image forming device 22 to apply a downward force on engagement member 160. In other embodiments, engagement member 160 may include a flat, planar contact surface 162 that faces primarily upward. In the embodiment illustrated, engagement member 160 includes a raised edge at an outermost end of engagement member 160 forming a catch 163 for retaining a corresponding latch in image forming device 22 along longitudinal dimension 113 of housing 110 against end 118 of housing 110 as discussed in greater detail below. In the embodiment illustrated, engagement member 160 is formed by a rib that protrudes outward away from end 118 of housing 110. In this embodiment, engagement member 160 is formed integrally with boss 150 and end 118 of housing 110. In this embodiment, engagement member 160 and boss 150 combine to form a unitary member with engagement member 160 protruding upward from boss 150.

With reference to FIG. 7, engagement member 170 is positioned on end 119 of housing 110 higher than boss 152 and at least a portion of electrical contacts 146, such as directly above one of electrical contacts 146 as illustrated, and lower than electrical contacts 144, such as between electrical contacts 146 and electrical contacts 144. Engagement member 170 is positioned higher than rotational axis 121 of photoconductive drum and rotational axis 143 of drive coupler 142, but lower than rotational axis 141 of drive coupler 140. Engagement member 170 is also positioned higher than engagement member 160. Engagement member 170 overlaps with at least a portion of electrical contacts 144 and 146 and with boss 152 along lateral dimension 148. Engagement member 170 is spaced toward side 116 of housing 110 from rotational axis 141 of drive coupler 140. In the embodiment illustrated, engagement member 170 also overlaps with engagement member 160 along lateral dimension 148. In the embodiment illustrated, engagement member 170 includes a latch-receiving shelf 171 having a rounded contact surface 172 that faces upward permitting the corresponding hold-down in image forming device 22 to apply a downward force on engagement member 170. In other embodiments, engagement member 170 may include a flat, planar contact surface 172 that faces primarily upward. In the embodiment illustrated, engagement member 170 includes a raised edge at an outermost end of engagement member 170 forming a catch 173 for retaining a corresponding latch in image forming device 22 along longitudinal dimension 113 against end 119 of housing 110 as discussed in greater detail below. In the embodiment illustrated, engagement member 170 is formed by a rib that protrudes outward away from end 119 of housing 110. In this embodiment, engagement member 170 is formed integrally with end 119 of housing 110 including a portion of housing 110 that protrudes outward away from end 119 and that supports electrical contacts 146.

Figure 8:
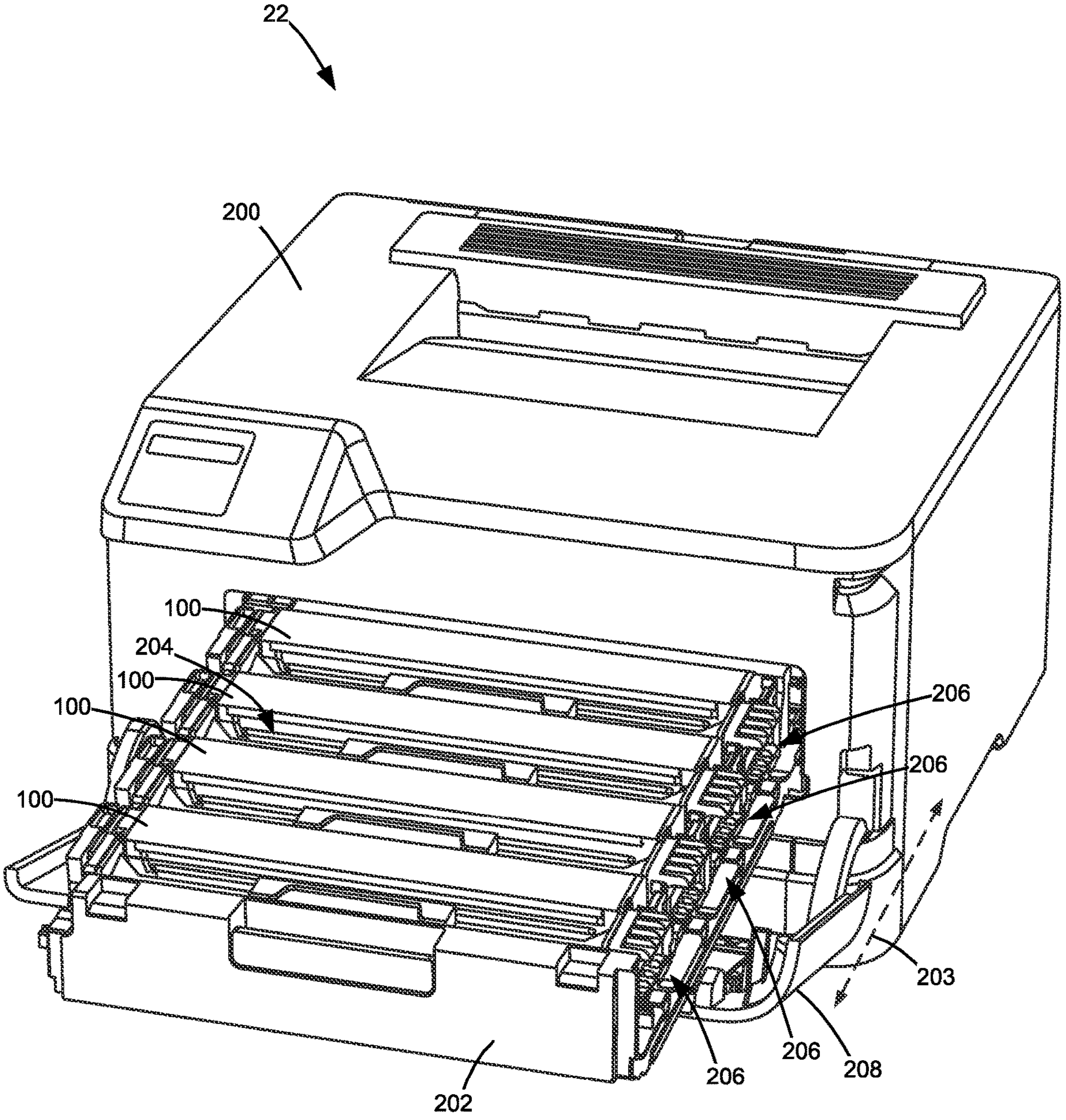
FIG. 8 is a perspective view of the image forming device showing a drawer having a basket holding four toner cartridges according to one example embodiment.

FIG. 8 shows image forming device 22 according to one example embodiment. In this embodiment, image forming device 22 includes a housing 200 and a drawer 202 mounted on housing 200. Drawer 202 is slidable into and out of housing 200 along a sliding direction 203 between an open position (shown in FIG. 8) and a closed position. Drawer 202 includes a basket 204 configured to receive and support four toner cartridges 100 in image forming device 22. In this embodiment, each of the four toner cartridges 100 is substantially the same except for the color of the toner contained therein. Toner cartridges 100 are vertically insertable into and removable from four corresponding positioning slots 206 of basket 204. Positioning slots 206 of basket 204 locate toner cartridges 100 in their operating positions within image forming device 22 when toner cartridges 100 are installed in basket 204 and drawer 202 is closed. In the embodiment illustrated, drawer 202 is accessible through an access door 208 of image forming device 22.

Figure 9:
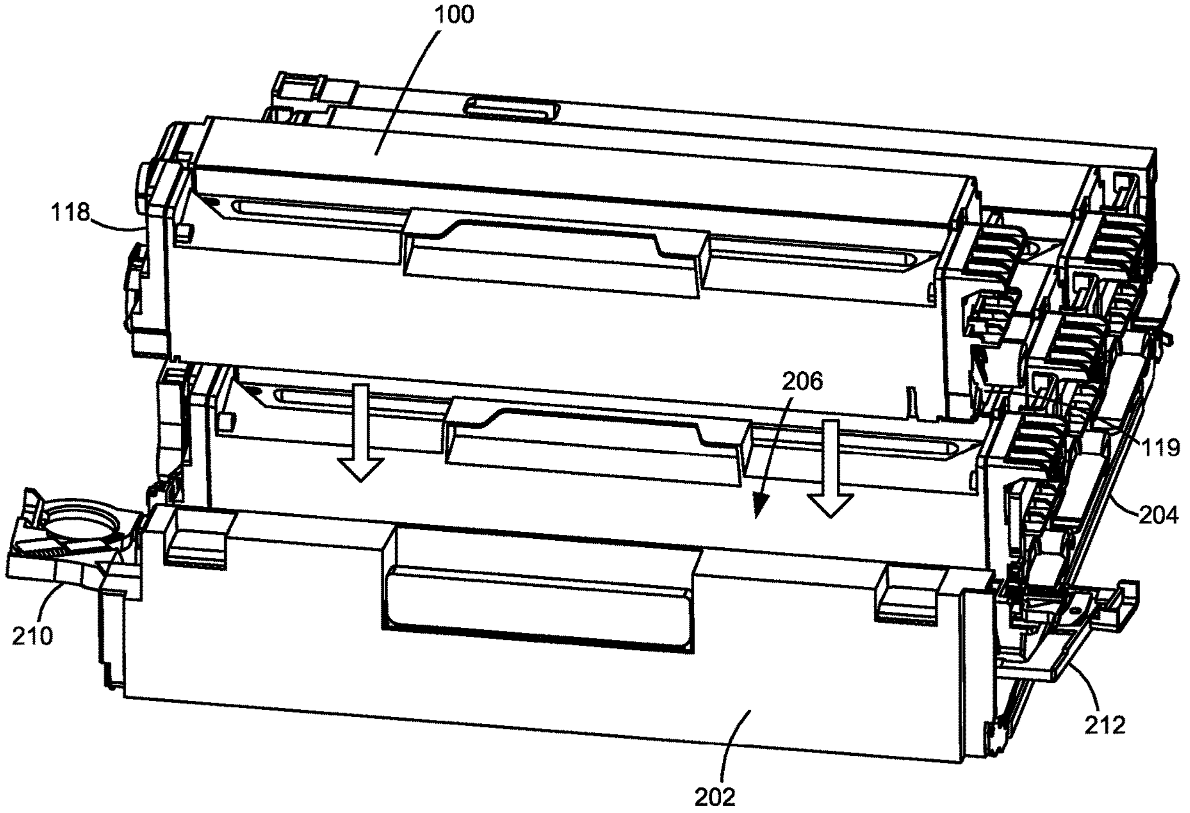
FIG. 9 is a perspective view of the basket showing a first toner cartridge removed from the basket and a pair of corresponding latches in unlatched positions according to one example embodiment.
Figure 10:
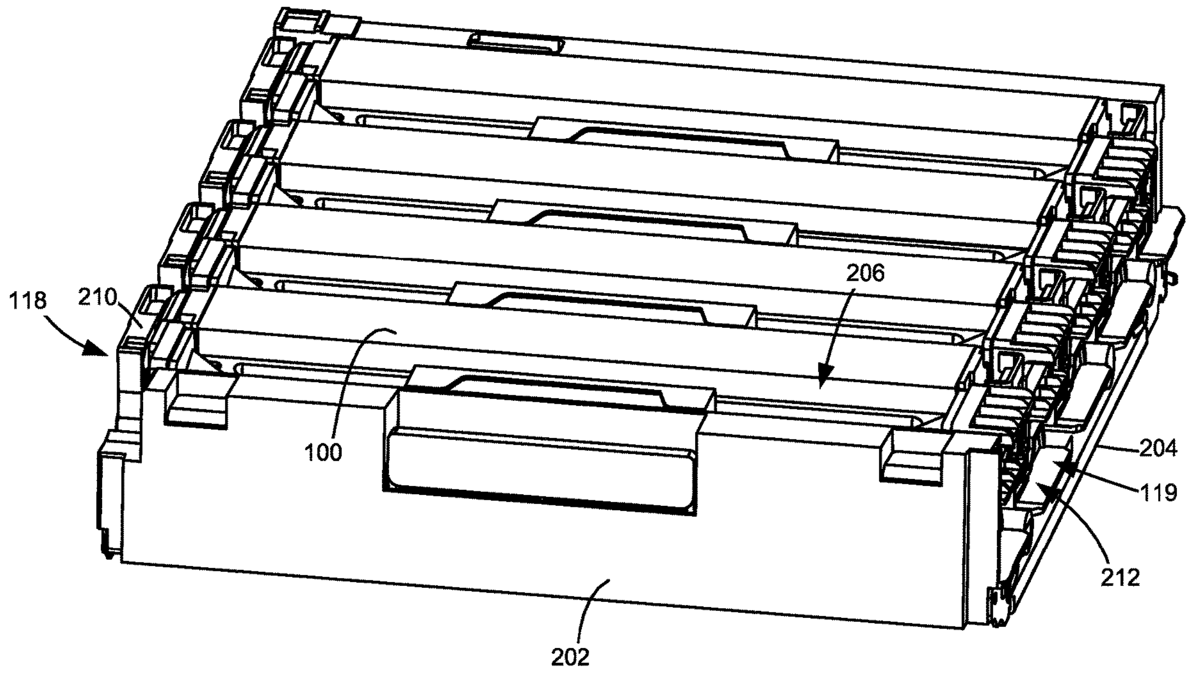
FIG. 10 is a perspective view of the basket showing the first toner cartridge installed in the basket and the pair of corresponding latches in latched positions according to one example embodiment.

FIGS. 9 and 10 show basket 204 in greater detail. In the example embodiment illustrated, each positioning slot 206 includes a pair of corresponding latches 210, 212 that secure a toner cartridge 100 in basket 204. One latch 210 is positioned at a first end of the positioning slot 206 proximate to one end 118 of the corresponding toner cartridge 100 and the other latch 212 is positioned at an opposite end of the positioning slot 206 proximate to the opposite end 119 of the corresponding toner cartridge 100. FIG. 9 shows a first toner cartridge 100 removed from its corresponding positioning slot 206 in basket 204 and a pair of corresponding latches 210, 212 in unlatched positions. FIG. 10 shows the first toner cartridge 100 installed in its corresponding positioning slot 206 in basket 204 with the corresponding latches 210, 212 in latched positions securing the first toner cartridge 100 in basket 204. In the example embodiment illustrated, each latch 210, 212 is manually movable between a latched position and an unlatched position permitting a user to selectively secure a particular toner cartridge 100 to basket 204 or remove a particular toner cartridge 100 from basket 204. In this embodiment, latches 210, 212 are pivotable between their latched and unlatched positions about respective pivot axes that run along sliding direction 203 of drawer 202; however, latches 210, 212 may move in other manners as desired.

Figure 11:
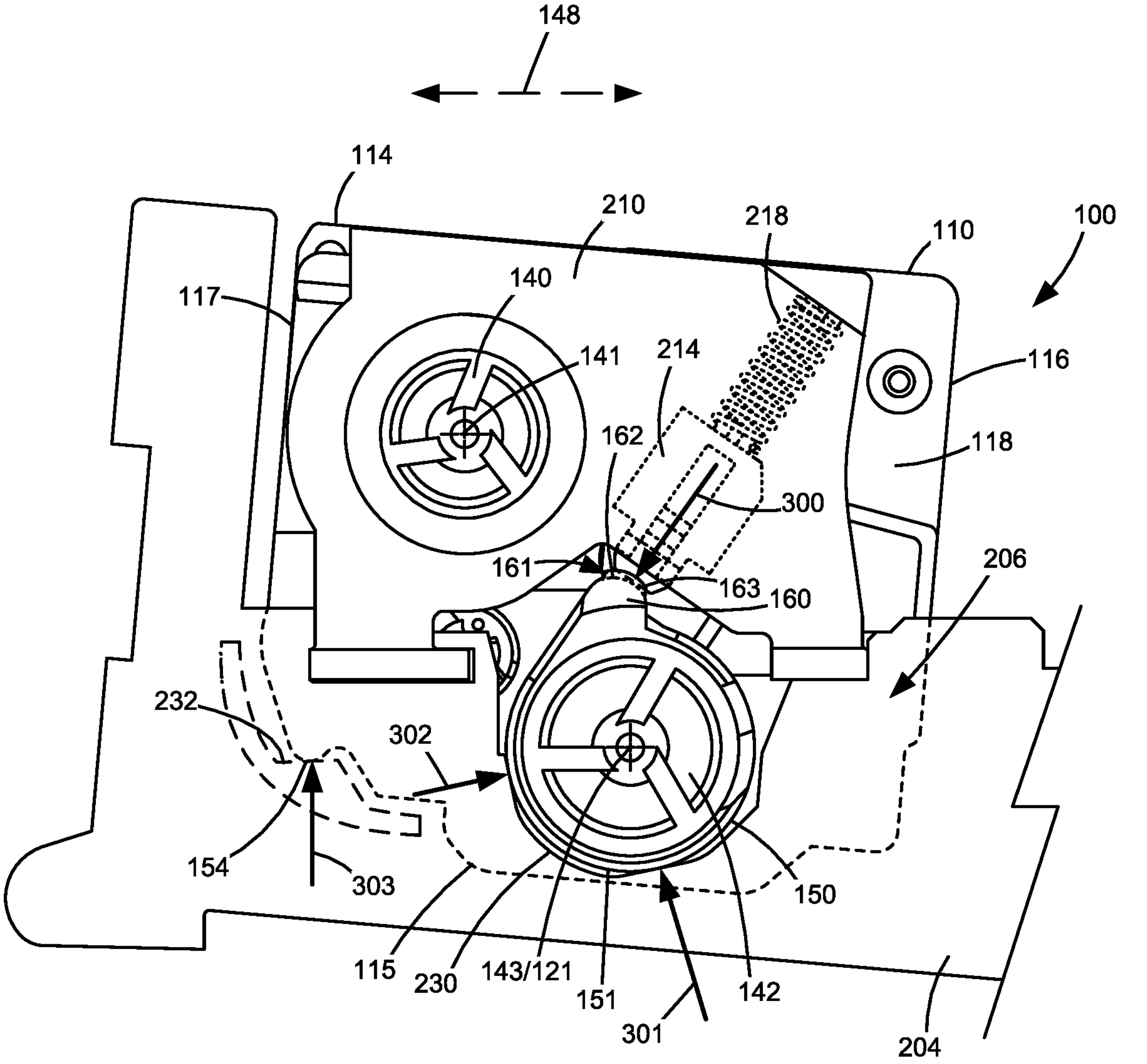
FIG. 11 is a first side elevation view of the toner cartridge installed in the basket with a first of the pair of corresponding latches in the latched position according to one example embodiment.
Figure 12:
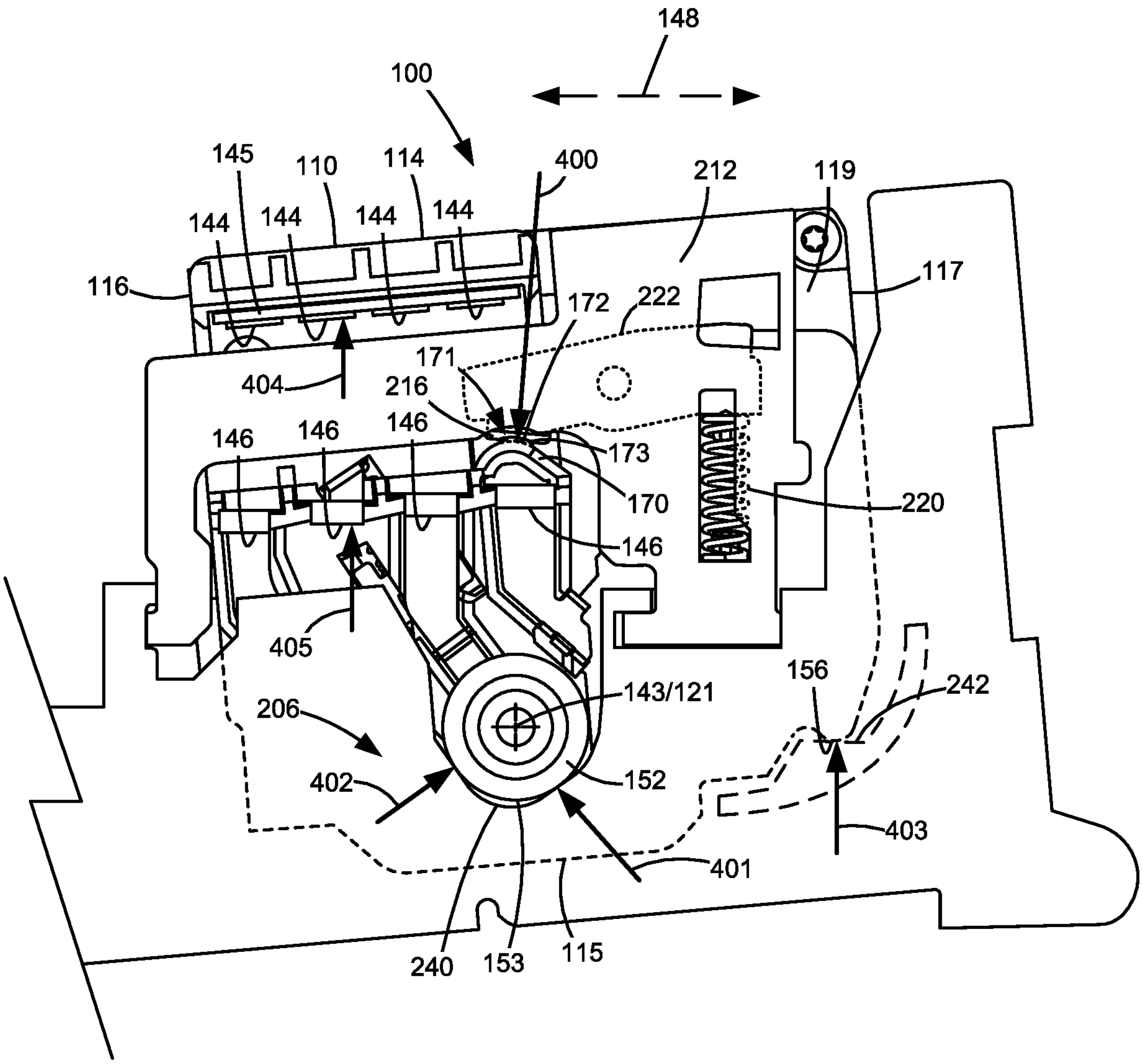
FIG. 12 is a second side elevation view of the toner cartridge installed in the basket with a second of the pair of corresponding latches in the latched position according to one example embodiment.

FIGS. 11 and 12 show ends 118, 119 of toner cartridge 100, respectively, with toner cartridge 100 installed in a positioning slot 206 of basket 204 with latches 210, 212 engaged with engagement members 160, 170 of toner cartridge 100 according to one example embodiment. Each latch 210, 212 includes a respective hold-down 214, 216 that contacts a corresponding engagement member 160, 170 of toner cartridge 100. Each hold-down 214, 216 is biased by a respective biasing member 218, 220 to supply a hold-down force to the corresponding engagement member 160, 170 of toner cartridge 100. For purposes of clarity, FIGS. 11 and 12 show portions of each hold-down 214, 216 and biasing member 218, 220 that are obscured by latches 210, 212 in broken line. In the example embodiment illustrated, each biasing member 218, 220 includes a compression spring; however, any suitable biasing member may be used as desired, such as, for example, an extension spring, a torsion spring, a leaf spring or a material having resilient properties. In the example embodiment illustrated, hold-down 214 is translatable along a biasing direction of biasing member 218 and hold-down 220 includes a pivotable bell-crank 222 biased by biasing member 220; however, each hold-down 214, 216 may be directly or indirectly biased according to any suitable method as desired.

FIG. 11 shows hold-down 214 of latch 210 in contact with contact surface 162 of engagement member 160 and FIG. 12 shows hold-down 216 of latch 212 in contact with contact surface 172 of engagement member 170. Hold-downs 214, 216 each apply a downward hold-down force 300, 400 to engagement members 160, 170 at ends 118, 119 of toner cartridge 100 as a result of the bias forces supplied by bias members 218, 220. In particular, in the example embodiment illustrated, the direction of hold-down force 300 is primarily downward toward bottom 115 of housing 110 and also toward side 117 of housing 110 and the direction of hold-down force 400 is primarily downward toward bottom 115 of housing and also slightly toward side 116 of housing 110. Forces 300, 400 applied by hold-downs 214, 216 to engagement members 160, 170 aid in retaining bosses 150, 152 of toner cartridge 100 against corresponding V-blocks 230, 240 of positioning slot 206. Contact between bosses 150, 152 and V-blocks 230, 240 defines a horizontal position of toner cartridge 100 along lateral dimension 148 and a vertical position of toner cartridge 100. In particular, contact between bosses 150, 152 and V-blocks 230, 240 defines a horizontal position of photoconductive drum 120 along lateral dimension 148 and a vertical position of photoconductive drum 120 in order to ensure that the toned image from photoconductive drum 120 is accurately transferred to the print media or intermediate transfer member. In this manner, forces 300, 400 applied by hold-downs 214, 216 to engagement members 160, 170 aid in preventing toner cartridge 100 from shifting horizontally along lateral dimension 148 or vertically during operation of toner cartridge 100 in image forming device 22. Forces 300, 400 applied by hold-downs 214, 216 to engagement members 160, 170 also aid in retaining rotational stops 154, 156 of toner cartridge 100 against corresponding frame surfaces 232, 242 of basket 204. For purposes of clarity, FIGS. 11 and 12 show rotational stops 154, 156 and frame surfaces 232, 242, which are obscured by outer portions of basket 204 in FIGS. 11 and 12, in broken line. Contact between rotational stops 154, 156 and frame surfaces 232, 242 defines a rotational position of toner cartridge 100. In this manner, forces 300, 400 applied by hold-downs 214, 216 to engagement members 160, 170 aid in preventing toner cartridge 100 from rocking during operation of toner cartridge 100 in image forming device 22.

With reference to FIG. 11, hold-down force 300 applied by hold-down 214 to engagement member 160 overcomes reaction forces 301, 302 from V-block 230 on boss 150 and reaction force 303 from frame surface 232 on rotational stop 154 at end 118 of toner cartridge 100, in addition to other less significant horizontal forces along lateral dimension 148 and vertical forces on toner cartridge 100, in order to retain boss 150 in V-block 230 and rotational stop 154 against frame surface 232. Similarly, with reference to FIG. 12, hold-down force 400 applied by hold-down 216 to engagement member 170 overcomes reaction forces 401, 402 from V-block 240 on boss 152 and reaction force 403 from frame surface 242 on rotational stop 156 as well as forces 404, 405 applied to electrical contacts 144, 146 by corresponding electrical contacts in image forming device 22 at end 119 of toner cartridge 100, in addition to other less significant horizontal forces along lateral dimension 148 and vertical forces on toner cartridge 100, in order to retain boss 152 in V-block 240 and rotational stop 156 against frame surface 242.

FIGS. 11 and 12 also show hold-downs 214, 216 positioned behind (as viewed in FIGS. 11 and 12) catches 163, 173 of engagement members 160, 170 such that catches 163, 173 aid in retaining latches 210, 212 in their latched positions proximate to ends 118, 119 of toner cartridge 100 when toner cartridge 100 is installed in positioning slot 206. For purposes of clarity, FIGS. 11 and 12 show contact surfaces

162, 172 of engagement members 160, 170 and corresponding contact portions of hold-downs 214, 226, which are obscured by catches 163, 173 of engagement members 160, 170 in FIGS. 11 and 12, in broken line. In order to unlatch toner cartridge 100 from basket 204, a user grasps a top end of each latch 210, 212 and manually pivots latches 210, 212 outward away from ends 118, 119 of toner cartridge 100 and downward from the latched positions of latches 210, 212 to the unlatched positions of latches 210, 212. As latches 210, 212 pivot toward their unlatched positions, hold-downs 214, 216 move relative to latches 210, 212 counter to the bias supplied by bias members 218, 220 as hold-downs 214, 216 pass over catches 163, 173 of engagement members 160, 170 permitting hold-downs 214, 216 to clear catches 163, 173. Once toner cartridge 100 is unlatched, a user may simply lift toner cartridge 100 from basket 204 in order to remove toner cartridge 100. Similarly, in order to latch toner cartridge 100 to basket 204, a user grasps each latch 210, 212 and manually pivots latches 210, 212 inward toward ends 118, 119 of toner cartridge 100 and upward from the unlatched positions of latches 210, 212 to the latched positions of latches 210, 212. As latches 210, 212 pivot toward their latched positions, hold-downs 214, 216 move relative to latches 210, 212 counter to the bias supplied by bias members 218, 220 as hold-downs 214, 216 pass over catches 163, 173 of engagement members 160, 170 permitting hold-downs 214, 216 to clear catches 163, 173 in order to engage contact surfaces 162, 172 of engagement members 160, 170 to retain toner cartridge 100 in positioning slot 206 as discussed above.

Although the example embodiment discussed above includes a single replaceable unit in the form of toner cartridge 100 for each toner color, it will be appreciated that the replaceable unit(s) of the image forming device may employ any suitable configuration as desired. For example, in one embodiment, the main toner supply for the image forming device is provided in a first replaceable unit and the developer unit and photoconductor unit are provided in a second replaceable unit. In another embodiment, the main toner supply for the image forming device and the developer unit are provided in a first replaceable unit and the photoconductor unit is provided in a second replaceable unit. Other configurations may be used as desired.

Further, it will be appreciated that the architecture and shape of toner cartridge 100 illustrated in FIGS. 2-5 is merely intended to serve as an example. Those skilled in the art understand that toner cartridges, and other toner containers, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner cartridge, comprising:

a housing having a top, a bottom, a first side and a second side positioned between a first longitudinal end and a second longitudinal end of the housing, the housing has a reservoir for holding toner;

a first drive coupler and a second drive coupler on the first longitudinal end of the housing for mating with a first corresponding drive coupler in an image forming device and a second corresponding drive coupler in the image forming device for receiving rotational motion from the first corresponding drive coupler in the image forming device and the second corresponding drive coupler in the image forming device when the toner cartridge is installed in the image forming device, the first drive coupler of the toner cartridge is positioned higher than the second drive coupler of the toner cartridge, the first drive coupler of the toner cartridge has a first rotational axis and the second drive coupler of the toner cartridge has a second rotational axis, the first rotational axis is positioned closer to the first side than the second rotational axis is to the first side; and an engagement member on the first longitudinal end of the housing, a contact surface of the engagement member is unobstructed from above permitting the contact surface of the engagement member to contact a corresponding hold-down in the image forming device and receive a downward hold-down force from the corresponding hold-down in the image forming device when the toner cartridge is installed in the image forming device, the contact surface of the engagement member is positioned lower than the first rotational axis of the first drive coupler of the toner cartridge and the contact surface of the engagement member is positioned higher than the second drive coupler of the toner cartridge, wherein an imaginary vertical plane extending along a longitudinal dimension of the housing that runs from the first longitudinal end to the second longitudinal end intersects the contact surface of the engagement member and the second drive coupler of the toner cartridge.

2. The toner cartridge of claim 1, further comprising:

a photoconductive drum rotatably positioned on the housing, a portion of an outer surface of the photoconductive drum is exposed along the bottom of the housing; and a developer roll rotatably positioned on the housing and positioned to supply toner from the reservoir to the photoconductive drum, wherein the first drive coupler of the toner cartridge is operatively connected to the developer roll to transfer rotational motion to the developer roll and the second drive coupler of the toner cartridge is operatively connected to the photoconductive drum to transfer rotational motion to the photoconductive drum.

3. The toner cartridge of claim 1, wherein the contact surface of the engagement member is positioned lower than the first drive coupler of the toner cartridge.

4. The toner cartridge of claim 1, further comprising a boss protruding outward from the first longitudinal end of the housing along the longitudinal dimension of the housing, the boss surrounding at least a portion of the second drive coupler of the toner cartridge, a bottom surface of the boss is unobstructed from below permitting the bottom surface of the boss to contact a corresponding frame in the image forming device for controlling a position of the toner cartridge when the toner cartridge is installed in the image forming device, the engagement member is formed integrally with the boss.

* * * * *